Jan. 28, 1969     S. S. STATA     3,424,265
REMOVABLE AND REPLACEABLE COMBINATION PAN AND
FLOOR GRATE FOR MOTOR VEHICLES
Filed April 21, 1967                         Sheet 1 of 2
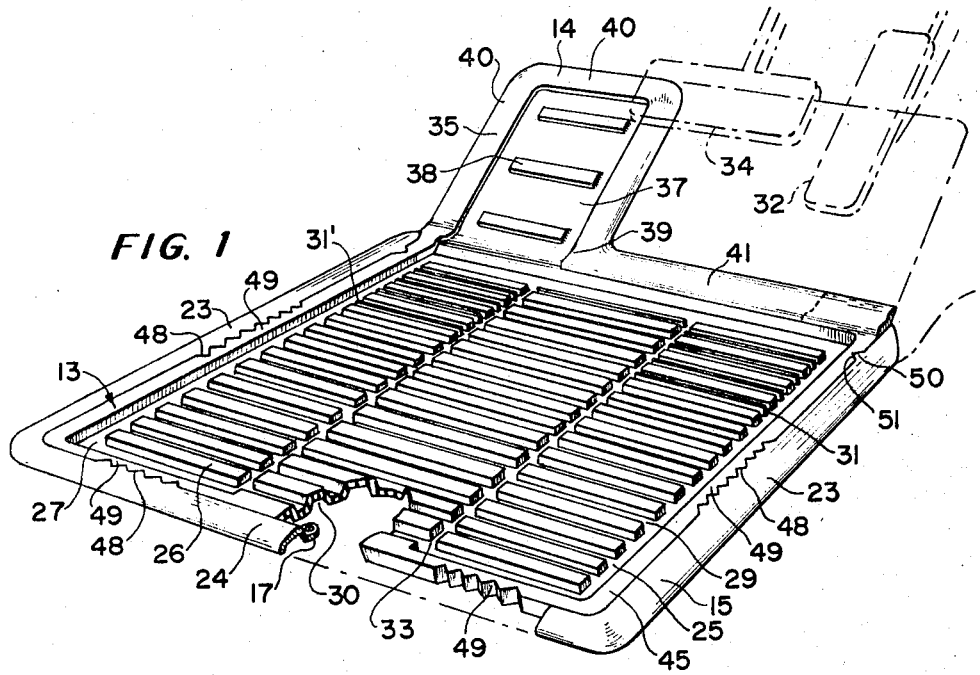
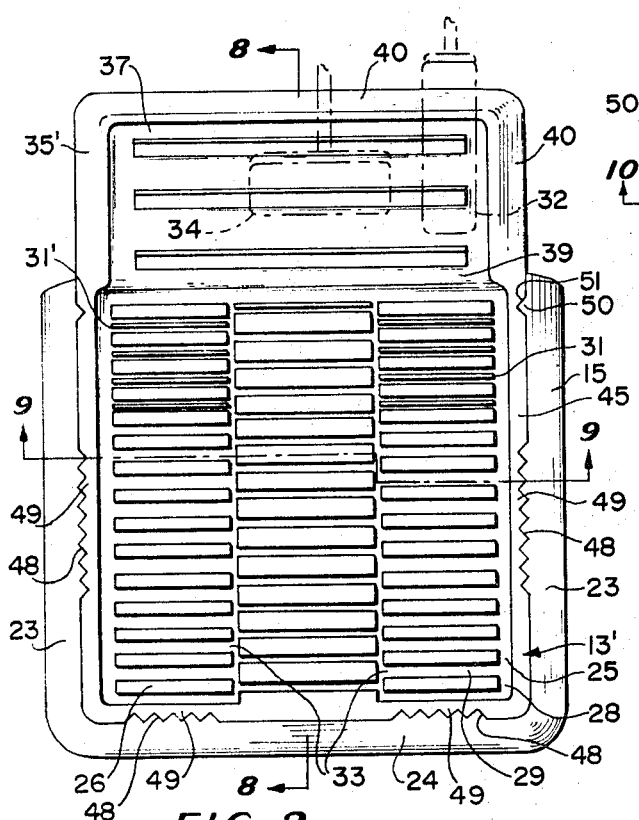
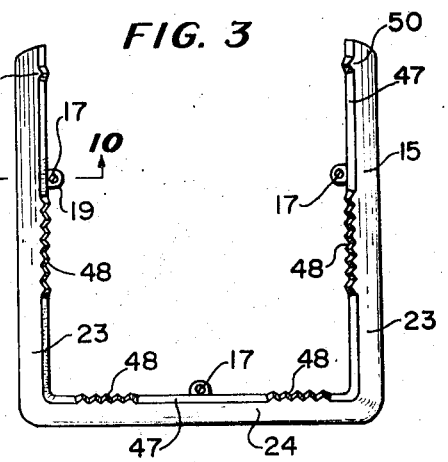
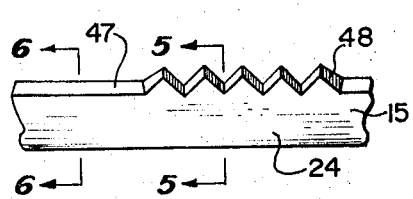
INVENTOR
STANLEY S. STATA

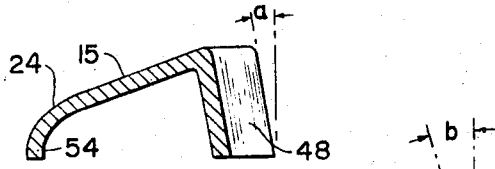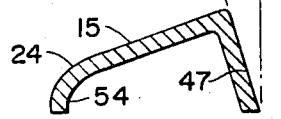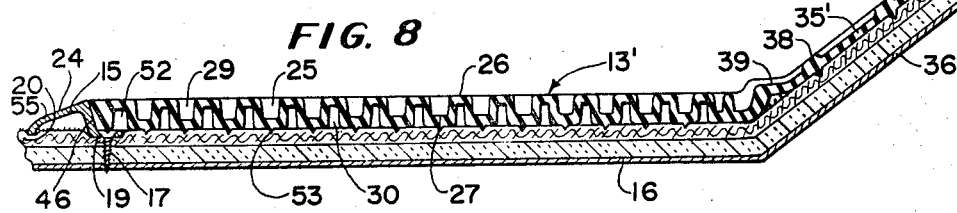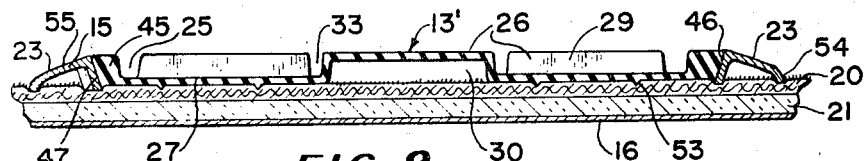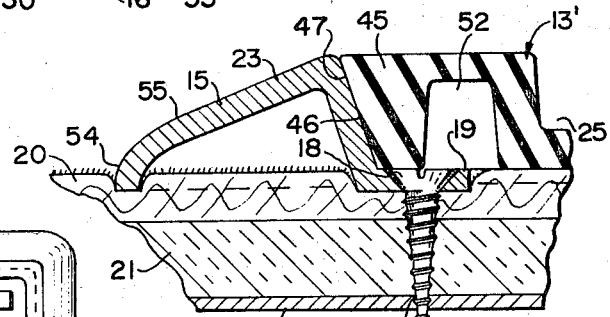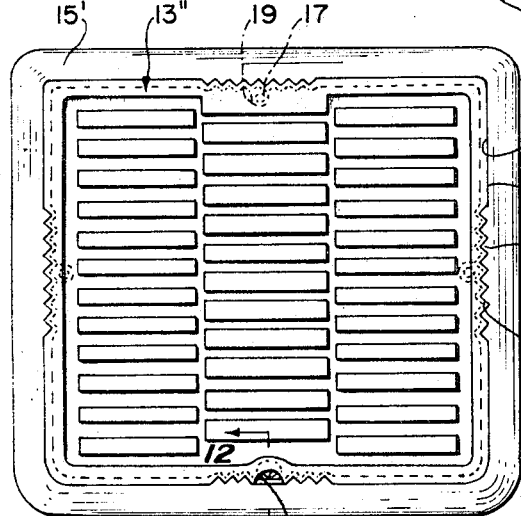

United States Patent Office 3,424,265
Patented Jan. 28, 1969

3,424,265
REMOVABLE AND REPLACEABLE COMBINATION PAN AND FLOOR GRATE FOR MOTOR VEHICLES
Stanley S. Stata, 301 Longwood St., Rockford, Ill. 61107
Filed Apr. 21, 1967, Ser. No. 632,751
U.S. Cl. 180—90.6                    18 Claims
Int. Cl. B62d 25/20; B60n 3/06

ABSTRACT OF THE DISCLOSURE

A floor mat of sufficient depth between the shoe-scraping ribs thereof to serve as a pan for collecting moisture and dirt in the anticipated amount, retains the moisture in the recesses between the ribs during evaporation while leaving the top surface of the ribs fairly dry, and the mat is designed to rest on top of the carpet on the floor of a motor vehicle while detachably secured in place by means of a relatively rigid retaining frame rigidly secured to the floor and having the marginal portions of the mat entered therein with a wedging fit. The frame, in the case of rear seat passengers, is of generally rectangular form and the mat is designed on all four sides to fit wedgingly therein, but, in the case of the driver's position and the front passenger's position, the frame is preferably generally U-shaped, and the mat has wedging engagement therein on only three sides. Both of these mats have a thinner forwardly extending ribbed foot scraping toe-board portion on the front end thereof which is flexed upwardly to rest on the carpet of the toe-board and drain freely into the main body portion of the pan. In all forms, saw-toothed portions on the frame mesh with saw-toothed marginal edge portions on the mat to insure tight wedging engagement, and the same secure holding of the mat in the right relationship to the frame every time it is replaced after having been removed for washing and cleaning.

---

This invention relates to a new and improved removable and replaceable combination pan and floor grate for motor vehicles.

The principal object of my invention is to provide a floor mat of sufficient depth between the shoe-scraping ribs thereof to serve as a combination pan and floor grate to collect moisture and dirt in the anticipated amount, the moisture being retained in the recesses between the ribs during evaporation while leaving the top surfaces of the ribs fairly dry, and the mat being designed to rest on top of the carpet on the floor of the motor vehicle, while detachably secured in place by means of a relatively rigid frame that is rigidly secured to the floor and has the marginal portions of the mat wedgingly engaged therein. Saw-toothed portions are provided on the frame meshing with saw-toothed portions on the mat not only to insure better gripping action to hold the mat in place, regardless of rough usage, but also make these parts self-aligning. In the case of the floor mat at the driver's position and the front passenger's position, the mat includes a thinner forwardly and upwardly extending ribbed foot scraping toe-board portion on the front end thereof, which rests on the carpet of the toe-board and drains freely into the main body portion of the pan, the frame for locating the mat in both of those cases being devoid of any front cross-portion, and the mat having locating notches provided on its marginal portions at both sides at the front for wedging engagement with V-projections on the front end of the side portions of the frame. In the case of the floor mat for the driver's position, the toe-board extension on the mat may extend upwardly only on the left hand side of the steering column, where the brake and accelerator pedals project upwardly from the toe-board and do not permit having the extension the full width of the mat, but it may be the full width of the mat the same as at the front passenger's position where the later style brake pedal and accelerator pedal extend downwardly from the instrument board over the toe-board. The mats for the rear passengers are removably secured in generally rectangular frames fastened to the floor. Thus, the mats in all four locations, although securely held in position once inserted in the frames, are easily removable and replaceable, thereby enabling thoroughly washing and drying the same at intervals for better neatness in appearance, when occasional cleaning out with a vacuum cleaner is not considered thorough enough.

The invention is illustrated in the accompanying drawings in which:

FIG. 1 is a perspective view of a floor mat and a retaining frame combination made in accordance with my invention, the mat shown being for the driver's position and having a narrow front toe-board portion, as required where the brake pedal and accelerator pedal both project from the toe-board, this view indicating by dot-and-dash lines how the front end portion may be extended the full width of the mat the same as in FIG. 2, where the new model cars have the brake pedal and accelerator pedal projecting downwardly from the instrument board in spaced relation to the toe-board, as indicated in dot-and-dash lines in both FIGS. 1 and 2, portions of the mat and frame being broken away to facilitate better showing of the construction;

FIG. 2 is a plan view of a floor mat and retaining frame combination usable at either the driver's position or the passenger's position, assuming the mat is used in a newer model car having the brake pedal and accelerator pedal projecting downwardly from the instrument board as indicated in dot-and-dash lines;

FIG. 3 is a plan view of the U-shaped retaining frame for the mats of FIGS. 1 and 2;

FIG. 4 is an enlargement of a saw-toothed portion of said frame;

FIGS. 5 and 6 are further enlargements of portions of said frame taken on correspondingly numbered lines of FIG. 4, showing a smaller draft angle in FIG. 5 than in FIG. 6;

FIG. 7 is a perspective view of the right hand front corner portion of the mat of FIG. 1, illustrating how a portion of the front edge portion of the floor mat to the right of the toe-board extension is bevelled off for snug engagement with the carpet on the toe-board in front of the mat to facilitate sweeping dirt off the toe-board carpet into the pan and showing also how one end portion of this front edge portion, which is cut to deflect upwardly, independently of the rest of the front edge portion, overlies the pivoted end of the accelerator pedal and permits sweeping dirt off the pedal into the pan;

FIGS. 8 and 9 are sections taken on the correspondingly numbered lines of FIG. 2 on a larger scale;

FIG. 10 is a section on line 10—10 of FIG. 3 showing how the retaining frame is secured to the floor and how the mat fits wedgingly therein flush with the top of the frame;

FIG. 11 is plan view of a mat and frame combination for rear seat passengers, and FIG. 12 is a section on the line 12—12 of FIG. 11 on an enlarged scale.

Similar reference numerals are applied to corresponding parts throughout the views.

Referring first to FIGS. 1 to 10, the reference numeral 13 in FIG. 1 designates a flexible floor mat made in accordance with my invention and 13' in FIG. 2 and related views is closely similar. The mat 13 in FIG. 1 is designed for use at the driver's position, the same having only a narrow toe-board extension 14 on the left-hand side to be disposed on the toe-board carpet to the left of the steering column, and 15 designates the rigid retaining frame therefor, the latter being molded or die-cast of aluminum to a generally U-shaped form and adapted to be fastened to the sheet metal floor 16 (FIG. 10) of the vehicle by means of sheet metal screws 17 entered in holes 18 in ears 19 provided on the frame, the screws passing through the carpet 20 and sound deadening jute 21 thereunder and threading in holes 22 pierced in the floor 16. These ears 19 are purposely provided in a horizontal plane below the level of the edges 54 of the flanges on the frame so that a much firmer mounting for the frame is assured by the deeper impression of these ears than by the rest of the frame when the screws 17 are properly tightened. Three of these screws are indicated, one in each of the side members 23 of the generally U-shaped frame 15, near the front ends, and one at the middle of the rear cross-portion 24 of said frame. Of course, more screws may be used if needed, but three are considered sufficient for rigid fastening of the frame. The mat 13 generally rectangular main body portion or pan 25 that is fairly deep and has spaced parallel scraping ribs 26 extending crosswise of and formed integral with the bottom 27. The ribs extend substantially the full depth of the pan and end short of the sides thereof to leave a deep annular recess 28 all around the pan communicating with the ends of parallel recesses 29 that are provided between the ribs, whereby to provide enough space for the collection of the anticipated amount of moisture and dirt, the moisture being thus retained in the pan during evaporation while leaving the top surfaces of the ribs 26 fairly dry. It will be noticed in that there are three rows of ribs, the ones in the outer two rows being narrower and spaced farther apart than the ones in the middle row, and also that the latter are offset with respect to the ribs in the outer rows so as to act as baffles to slow down the flow of any water that may be present so that there is no likelihood of water overflowing one side or the other of the pan 25, as for example, when the car turns a corner fast. This is also of advantage in quick starting or stopping. The pan 25 can be easily cleared of dirt at intervals with a vacuum cleaner to keep the mat neat and clean so it really enhances the appearance of the car's interior, besides eliminating the unsightliness that results when the carpeting becomes worn at certain spots. The unit can also be colored to harmonize with a car's interior and thereby further improve its appearance. In other words, whereas these units are designed for application to new cars on the assembly line, existing cars with worn spots can have these spots covered up with the present improved floor mat and retaining frame combination, and in that way their interiors may be made to look like new. To conserve in the cost of production and also to make the mats lighter weight, all of the ribs 26 may be made hollow, as indicated at 30. The addition of intermediate solid thinner parallel ribs 31 midway between the other ribs 26 in the right-hand front corner portion of the pan, make this portion serve as a heel rest behind the accelerator pedal 32 disposed in front of the pan, these additional ribs 31 allowing drainage of moisture from between them into the adjacent recesses 28 and the recesses 33 provided at opposite sides of the middle row of ribs 26. A similar set of thin ribs 31' is provided in the front left hand corner of the pan for an additional heel rest, as that is where the driver is most apt to rest his left foot in between operations of the brake pedal 34.

The flexible toeboard extension 35 in FIG. 1 is molded integral with the pan 25 and is generally rectangular in form and fairly narrow and extends forwardly from the left front corner of the pan and is flexed upwardly and adapted to rest on the carpet of the toeboard, similarly as the toeboard extension 35' of mat 13' is illustrated in FIG. 8, the latter being a full width toeboard extension as illustrated in FIG. 2, specially designed for use in later model cars that have the accelerator pedal 32 and brake pedal 34 extending downwardly from the instrument board in spaced relation to the toeboard. Obviously, the mat shown in FIG. 2 may therefore be used equally well in the driver's position and in the front passenger's position. The toeboard extensions 35 and 35', as clearly illustrated in FIG. 8, are thinner than the pan 25 and normally are disposed in coplanar relationship to the top of the pan but arranged to be flexed upwardly at an angle of approximately 45° to rest on the carpet on the toeboard 36. The toeboard extensions 35 and 35' each have a shallow generally rectangular recess 37 provided therein from which project a plurality of foot scraping ribs 38 of small height extending crosswise of the extension in widely spaced relation off which there is good drainage at 39 into the pan 25. Thus, there is no occasion for any moisture scraped off the shoes on the mat getting onto the carpet 20, whether it be in using the ribs 38 of small height or the ribs 26 of greater height. All of the moisture is retained in the pan 25 until evaporated and, of course, all of the dirt is also retained therein, but the top surfaces of the ribs 26 and 38 always remain fairly dry. The marginal edges 40 of the toeboards 35 and 35' are tapered down to a rather thin edge as seen in FIG. 8, making it an easy matter to sweep dirt from the adjacent toeboard carpet onto these toeboard extensions to be ultimately collected in the pans 25.

In the case of the mats shown in FIG. 1 having the narrow toeboard extension, the front edge portion of the pan 25 to the right of the extension is defined by a forwardly extending flexible flange 41 that is relatively thin and readily flexible to conform to the toeboard and has a tapered forward edge 42 to facilitate the sweeping of dirt from the toeboard carpet directly into the pan. A slit 43 in this flange 41, as shown in FIG. 7, permits the right-hand end portion 34 of the flange to be flexed to project upwardly and rest on the lower hinged end portion of the conventional accelerator pedal 32' that is pivoted with respect to the toeboard 36. There again, the thin forward edge 42 permits sweeping of dirt from the pedal directly into the pan over the flange 44.

The mat 13 and the similar one 13' shown in FIGS. 2 and 8 to 10 have thick marginal side and end walls 45 with downwardly tapered sides, as indicated at 46, to engage wedgingly on the correspondingly inclined inner sides 47 of the frame 15. At spaced intervals the frame 15 has saw-toothed portions 48 on the inner side, which as seen by comparison of FIGS. 5 and 6, have a smaller draft angle $a$ than the draft angle $b$ for the smooth portions 47, whereby when the mating saw-toothed portions 49 provided on the sides of the mats 13 and 13' have wedging engagement in the saw-toothed portions 48, a much tighter hold is assured both because of the greater surface to surface contact afforded and the smaller draft angle of wedging engagement. There is also a single toothed projection 50 provided on the inner side of the side members 23 of the frame 15 near the front end, and these have similar wedging interengagement with V-shaped notches 51 provided on the sides of the mats to insure holding the mat down at the upturn of the toeboard extension. Also this feature helps to make the interfitting parts self-aligning and that is important whenever a mat is removed for washing and cleaning and later replaced, and it requires little or no pressure applied to the marginal edge portions of the mats to get them flush with the top of the retaining frames 15. If desired, the walls 45 may be hollow, as seen at 52 in FIGS. 8 and 10, to provide some yield and thus reduce the tightness of holding the mats in the frames. There is no likelihood with this construction of the mats ever tending to shift about on the carpet relative to the frames. However, downwardly projecting pointed spurs 53 are, nevertheless, molded integral with the bottom of the mats as well as their toeboard extensions to serve by impression in the carpet when the mats are in place inside the frames to take hold of the carpet and positively prevent displacement of the mats in any direction form a set position, even when heavy foot pressure is applied in scraping off dirt from the bottoms of shoes.

It should be clear, therefore, that so long as the mats remain in place in their retaining frames, any dirt, water, or snow on the bottom of a person's shoes can be quickly and easily disposed of in the pans 25 provided in the mats 13 and 13' and, inasmuch as the frames 15 when fastened tightly by screws 17 have their marginal downwardly projecting edge portions 54 impressed in the carpet 20, it is an easy matter to sweep dirt from the carpet around the mats into the pans over the inclined edge portions 55 of the frames to keep the interior of the car as neat as possible. Then, assuming vacuum cleaning of the mats is not sufficient, as, for example, because of unsightly smears of dirt that might not otherwise be so easily removed, the mats can be removed readily enough from the frames for thoroughly washing and drying the same and they can be replaced in the frames in precisely the same position as before.

Referring next to FIGS. 11 and 12, the floor mat 12" shown here is designed for use in each of the two rear seat locations, the same fitting in a complete four-sided rectangular retaining frame 15'. There is the same method of interengagement of saw-toothed portions 48 on the frame with saw-toothed portions 49 on the mat, and a lesser degree of wedging engagement of the inclined side portions 46 on the mat with the inclined inner faces 47 of the frame. However, inasmuch as there is no toeboard extension 35 or 35' as in the other two forms, which afford a means of one's taking hold of in applying a pull in withdrawing the mat from the frame, I provide a notch 56 in the mat 13" at the middle of one side thereof in which one may enter a finger or the end of a screw driver bit or other prying tool, to lift the mat enough so that it can be taken hold of at one edge to be pulled upwardly out of the frame. The frame 15', it will be noticed in FIG. 11 has screws 17 fastening the same to the floor at the middle of each of the four sides of the frame, ears 19 being provided on the frame 15' for this purpose at all four locations.

It is believed the foregoing description conveys a good understanding of the objects and advantages of my invention.

I claim:

1. In a floor mat construction for vehicles having a substantially horizontal floor overlaid with carpet of compressible material, a generally rectangular frame of relatively rigid material resting on the carpet and rigidly secured to the floor through said carpet so as to be impressed therein and thereby held against lateral displacement, said frame having outwardly extending flange portions that are downwardly inclined and impressed into the carpet so as to facilitate sweeping of dirt off the carpet around said frame over said frame, the inner side of said frame having saw-toothed portions provided thereon, a floor mat of flexible material which includes a generally rectangular pan resting on the carpet inside and closely confined by said frame so as to fix the location of said mat on said floor, the pan having side walls with saw-toothed outer sides which interfit with the aforesaid saw-toothed projections to secure the floor mat in said frame so as to be removable from and replaceable in said frame, and shoe-scraper means provided in said pan whereby dirt and moisture scraped from the bottom of shoes is retained in said pan for evaporation of the moisture while the top of said scraper means remains fairly dry, the top of said mat lying substantially flush with the top of said frame to facilitate sweeping dirt from the carpet around said frame over said frame into said pan.

2. A floor mat construction as set forth in claim 1 wherein the frame has on its inner sides between the saw-toothed portions downwardly and inwardly inclined surfaces against which matching inclined surfaces provided on the outer sides of said pan between the saw-toothed portions thereof have wedging engagement when the pan is entered in said frame and pressed downwardly into place.

3. A floor mat construction as set forth in claim 1 wherein the frame has on its inner sides between the saw-toothed portions downwardly and inwardly inclined surfaces against which matching inclined surfaces provided on the outer sides of said pan between the saw-toothed portions thereof have wedging engagement when the pan is entered in said frame and pressed downwardly into place, the saw-toothed portions of said frame being also downwardly and inwardly inclined and wedgingly engaged by the saw-toothed portions on said pan.

4. A floor mat construction as set forth in claim 1 wherein the frame has on its inner sides between the saw-toothed portions downwardly and inwardly inclined surfaces against which matching inclined surfaces provided on the outer sides of said pan between the saw-toothed portions thereof have wedging engagement when the pan is entered in said frame and pressed downwardly into place, the saw-toothed portions of said frame being also downwardly and inwardly inclined and wedgingly engaged by the saw-toothed portions on said pan, the angle of inclination of the saw-toothed portions of said frame and pan being smaller than the inclination of the intermediate portions of said frame and pan, whereby to provide tighter wedging interengagement between the frame and pan at said saw-toothed portions.

5. A floor mat construction as set forth in claim 1 wherein the shoe-scraper means provided in said pan is in the form of ribs integral with the bottom of said pan in spaced relation to one another and to the sides of said pan, whereby moisture collected in said pan is substantially uniformly distributed to facilitate evaporation thereof.

6. A floor mat construction as set forth in claim 1 wherein said frame is generally U-shaped with the arms of the U substantially parallel and projecting forwardly from the cross-portion of the U, the frame having on the inner side of the arms thereof near the front inward V-shaped projections for locating engagement in V-shaped notches provided in the pan on opposite sides thereof.

7. A floor mat construction as set forth in claim 1 wherein said frame is generally U-shaped with the arms of the U substantially parallel and projecting forwardly from the cross-portion of the U, the frame having on the inner side of the arms thereof near the front inward V-shaped projections for locating engagement in V-shaped notches provided in the pan on opposite sides thereof, the V-shaped projections being downwardly and inwardly inclined and the notched portions on the sides of said pan being correspondingly inclined for tight wedging engagement of said projections therein.

8. A floor mat construction as set forth in claim 1 wherein said frame is generally U-shaped with the arms of the U substantially parallel and projecting forwardly from the cross-portion of the U, whereby said pan is closely confined on three sides by said frame, the mat including a generally rectangular toeboard extension on the front end thereof that is normally in substantial coplanar relationship to the top of the pan but is flexible upwardly to overlie carpet on the toeboard.

9. A floor mat construction as set forth in claim 1 wherein said frame is generally U-shaped with the arms of the U substantially parallel and projecting forwardly from the cross-portion of the U, whereby said pan is closely confined on three sides by said frame, the mat including a generally rectangular toeboard extension on the front end thereof that is normally in substantial coplanar relationship to the top of the pan but is flexible upwardly to overlie the carpet on the toeboard, the toeboard extension having a generally rectangular recess provided therein communicating at the rear thereof with the front portion of said pan so as to drain into said pan.

10. A floor mat construction as set forth in claim 1 wherein said frame is generally U-shaped with the arms of the U substantially parallel and projecting forwardly from the cross-portion of the U, whereby said pan is closely confined on three sides by said frame, the mat including a generally rectangular toeboard extension on the front end thereof that is normally in substantial coplanar relationship to the top of the pan but is flexible upwardly to overlie the carpet on the toeboard, the toeboard extension having a generally rectangular recess provided therein communicating at the rear thereof with the front portion of said pan so as to train into said pan, and shoe-scraper ribs integral with and extending transversely of said toeboard extension in spaced relation to one another and to the sides of said recess whereby moisture scraped off shoes on said ribs can drain from said recess into said pan.

11. A floor mat construction as set forth in claim 1, wherein the mat includes a generally rectangular toeboard extension on the front end thereof that is narrow in relation to the rest of the mat and extends forwardly from the left side thereof and is normally in coplanar relationship to the top of the pan but is flexible upwardly to overlie the carpet on the toeboard, said toeboard extension draining into said pan.

12. A floor mat construction as set forth in claim 1, wherein the mat includes a generally rectangular toeboard extension on the front end thereof that is narrow in relation to the rest of the mat and extends forwardly from the left side thereof and is normally in coplanar relationship to the top of the pan but is flexible upwardly to overlie the carpet on the toeboard, said toeboard extension draining into said pan, the toeboard having a generally rectangular recess provided therein communicating at the rear thereof with the front portion of said pan so as to drain into said pan, and shoescraper ribs integral with said toeboard extension and extending transversely thereof in spaced relation to one another and to the sides of said recess, whereby moisture scraped off said shoes can drain from said recess into said pan.

13. In a floor mat construction for vehicles having a substantially horizontal floor overlaid with carpet of compressible material and an upwardly inclined toeboard portion over which an accelerator pedal extends downwardly from an instrument board and a brake pedal also extends downwardly from said instrument board, both in vertically spaced relation to the toeboard, a generally rectangular frame of relatively rigid material resting on the carpet and rigidly secured to the floor through said carpet so as to be impressed therein and thereby held against lateral displacement, said frame having outwardly extending downwardly inclined flange portions impressed into the carpet so as to facilitate sweeping of dirt off the carpet around said frame over said frame, a floor mat of flexible material which includes a generally rectangular pan resting on the carpet inside and closely confined by said frame so as to fix the location of said mat on said floor, the mat including a generally rectangular toeboard extension on the front end thereof of the same width as said mat and normally in coplanar relationship to the top of the pan but flexible upwardly to overlie the carpet on the toeboard under the accelerator pedal and brake pedal, the toeboard extension being adapted to drain into said pan, and shoe-scraper means provided in said pan whereby dirt and moisture scraped from the bottom of shoes is retained in said pan for evaporation of moisture while the top of said scraper means remains fairly dry, the top of said pan lying substantially flush with the top of said frame to facilitate sweeping dirt from the carpet around said frame over said frame into said pan, said mat being removable from and replaceable in said frame to facilitate thorough cleaning of said pan and scraper means.

14. A floor mat construction as set forth in claim 13 wherein the shoe-scraper means provided in said pan is in the form of ribs integral with the bottom of said pan in spaced relation to one another and to the sides of said pan, whereby moisture collected in said pan is substantially uniformly distributed to facilitate evaporation thereof.

15. A floor mat construction as set forth in claim 13 wherein the toeboard extension has a generally rectangular recess provided therein communicating at the rear thereof with the front portion of said pan so as to drain into said pan, and shoe scraper ribs integral with said toeboard extension extending transversely thereof in spaced relation to one another and to the sides of said recess, whereby moisture scraped off shoes on said ribs can drain from said recess into said pan.

16. A floor mat construction for vehicles having a substantially horizontal floor overlaid with carpet of compressible material, a generally rectangular frame of relatively rigid material resting on the carpet and rigidly secured to the floor through said carpet so as to be impressed therein and thereby held against lateral displacement, said frame having outwardly extending flange portions that are downwardly inclined and impressed into the carpet to facilitate sweeping of dirt off the carpet around said frame over said frame, a floor mat of flexible material which includes a generally rectangular pan resting on the carpet inside and closely confined by said frame so as to fix the location of said mat on the said floor, and a plurality of shoe scraper ribs in spaced parallel relationship to one another and to the sides of said pan whereby dirt and moisture scraped from the bottom of shoes is retained in said pan for evaporation of moisture while the top of said scraper ribs remains fairly dry, the top of said pan lying substantially flush with the top of said frame to facilitate sweeping dirt from the carpet around said frame over said frame into said pan, said mat being removable from and replaceable in said frame to facilitate thorough cleaning of said pan and scraper ribs, said ribs extending transversely of said pan and provided in a plurality of rows in spaced relation to one another and to the sides of said pan whereby moisture collected in said pan is substantially uniformly distributed to facilitate evaporation thereof, the ribs in alternate rows being aligned transversely of said pan and in staggered relation to ribs in an intermediate row, whereby the latter ribs act as baffles to slow down the flow of moisture and thereby reduce likelihood of moisture overflowing one side or the other of said pan due to violent flow crosswise of said pan.

17. In a floor mat construction for vehicles having a substantially horizontal floor overlaid with carpet of compressible material, a frame of relatively rigid material resting on the carpet having outwardly extending flange portions that are downwardly inclined and adapted to be impressed into the carpet so as to facilitate the sweeping of dirt off the carpet around said frame over said frame, said frame having at spaced points around the same perforated ears receiving screws for fastening the frame rigidly to the floor through the carpet so as to impress the edges of said flange portions into the carpet to hold the frame against lateral displacement, the ears projecting downwardly to a horizontal plane below the horizontal plane of the edges of said flange portions whereby to utilize the ears with their deeper impression in the carpet than the flange portions for better anchoring of the frame against lateral displacement, a floor mat of flexible material which includes a pan resting on the carpet inside and closely confined by said frame so as to fix the location of said mat on said floor, and shoe-scraper means provided in said pan whereby dirt and moisture scraped from the bottom of shoes is retained in said pan for evaporation of the moisture while the top of said scraper means remains fairly dry, the top of said pan lying substantially flush with the top of said frame to facilitate sweeping dirt from the carpet around said frame over said frame into said pan.

18. In a floor mat construction for vehicles having a substantially horizontal floor overlaid with carpet of compressible material and an upwardly inclined toeboard portion over which an accelerator pedal extends forwardly and upwardly from its hinged rear end which is movable pivotally with respect to the floor at the junction of the floor and toeboard portion, a floor mat of flexible material which includes a generally rectangular pan resting on the carpet with the front thereof at the junction of the floor and toeboard portion directly behind the hinged rear end of said accelerator pedal, said floor mat including a forwardly extending substantially horizontal flexible flange on the front end of said pan resting on the rear portion of said toeboard and having one section thereof independently flexible upwardly relative to the rest of said flange and resting on the rear portion of said accelerator pedal in angular relation to the rest of said flange, the front edge of the entire flange including the pedal overlying portion being tapered to a relatively thin edge to facilitate sweeping of dirt from the toeboard carpet and from the pedal rearwardly over the flange into the pan, shoe-scraper means provided in said pan whereby dirt and moisture scraped from the bottom of shoes is retained in said pan for evaporation of moisture while the top of said scraper means remains fairly dry, and a frame of relatively rigid material resting on the carpet and rigidly secured to the floor through said carpet so as thereby to be held against lateral displacement, said frame having outwardly extending downwardly inclined flange portions impressed into the carpet so as to facilitate the sweeping of dirt off the carpet around said frame over the same into the pan, the top of said pan lying substantially flush with the top of said frame to facilitate sweeping dirt from the carpet around said frame over said frame into said pan, said frame serving to confine the pan portion of said mat closely therein to fix its location on said floor, and said mat being removable from and replaceable in said frame to facilitate thorough cleaning of said pan and scraper means.

References Cited

UNITED STATES PATENTS

| | | | |
|---|---|---|---|
| 2,202,636 | 5/1940 | McClelland. | |
| 2,651,540 | 9/1953 | Zullo | 296—1 |
| 2,680,385 | 6/1954 | Estin. | |
| 2,810,672 | 10/1957 | Taylor | 296—1 |
| 2,820,980 | 1/1958 | Karas | 16—7 |
| 3,100,522 | 8/1963 | McIntyre. | |
| 3,114,272 | 12/1963 | Sawyer | 296—1 X |
| 3,149,875 | 9/1964 | Stata | 296—1 |
| 3,312,497 | 4/1967 | Stata | 296—1 |

FOREIGN PATENTS 722,551  1/1955  Great Britain.

KENNETH H. BETTS, *Primary Examiner.*

U.S. Cl. X.R.

296—1

UNITED STATES PATENT OFFICE
CERTIFICATE OF CORRECTION

Patent No. 3,424,265  January 29, 1969

Stanley S. Stata

It is certified that error appears in the above identified patent and that said Letters Patent are hereby corrected as shown below:

Column 7, line 15, "train" should read -- drain --.

Signed and sealed this 17th day of March 1970.

(SEAL)
Attest:

Edward M. Fletcher, Jr.

Attesting Officer

WILLIAM E. SCHUYLER, JR.

Commissioner of Patents